No. 733,896. PATENTED JULY 14, 1903.
J. W. BAILEY.
PROCESS OF MAKING LITHARGE.
APPLICATION FILED OCT. 18, 1900.
NO MODEL.
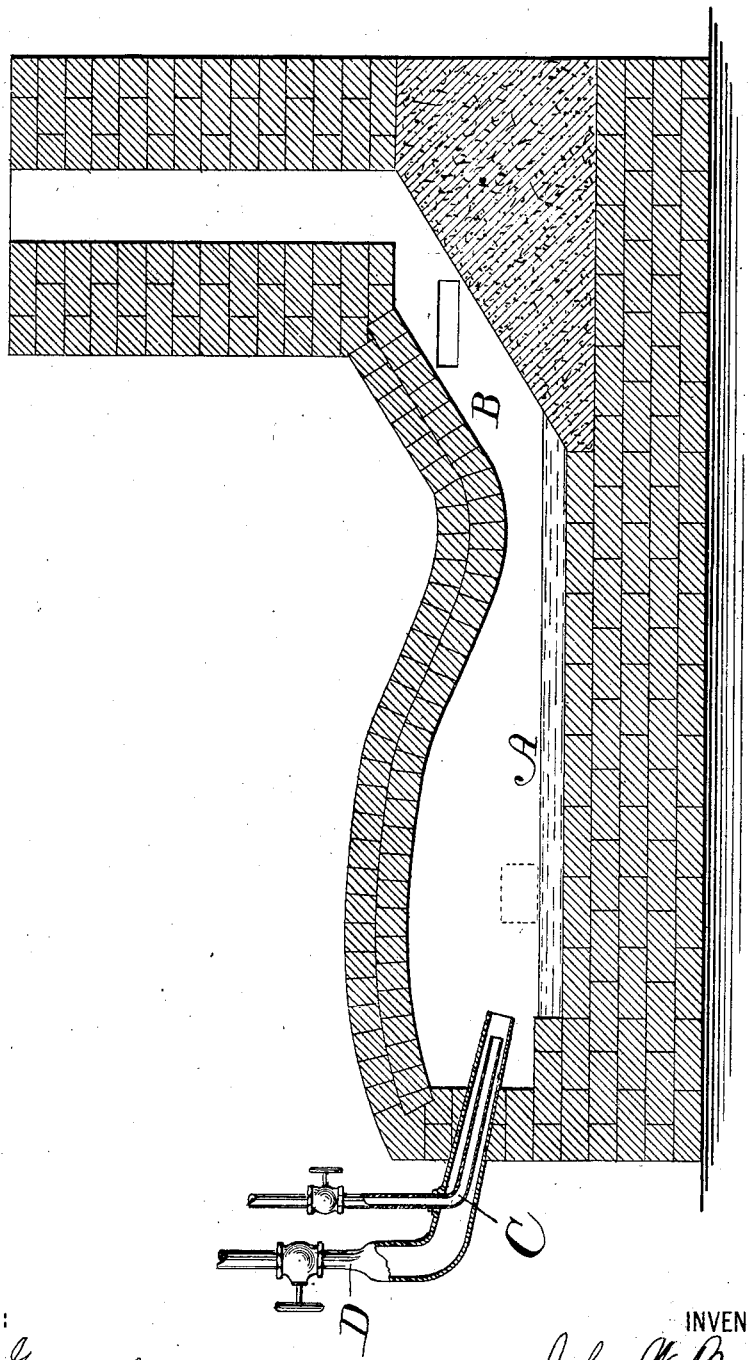
WITNESSES:
INVENTOR
John W. Bailey,
BY
Kenyon & Kenyon
ATTORNEYS.

No. 733,896. Patented July 14, 1903.

UNITED STATES PATENT OFFICE.

JOHN W. BAILEY, OF JERSEY CITY, NEW JERSEY, ASSIGNOR TO UNION LEAD AND OIL COMPANY, A CORPORATION OF NEW JERSEY.

PROCESS OF MAKING LITHARGE.

SPECIFICATION forming part of Letters Patent No. 733,896, dated July 14, 1903.

Application filed October 18, 1900. Serial No. 33,437. (No specimens.)

*To all whom it may concern:*

Be it known that I, JOHN W. BAILEY, a citizen of the United States, and a resident of Jersey City, county of Hudson, and State of New Jersey, have invented a certain new and useful Improvement in Processes of Making Litharge, of which the following is a specification, reference being had to the accompanying drawing, which forms a part hereof.

My invention relates to an improved process of manufacturing oxid of lead or litharge; and its object is to greatly simplify and cheapen the reduction of metallic lead or parts of the corroded lead into litharge or oxid of lead.

My invention consists in subjecting lead in suitable form in a reverberatory furnace to a flame produced by a suitable hydrocarbon fuel mingled with or atomized by a jet of steam.

In the accompanying drawing I have shown a furnace which is especially adapted for carrying out my improved process. This drawing is a sectional view through the center of the furnace.

A is the hearth.

B is an inclined flue leading to the chimney, into which flue the stock is fed, so as to utilize the waste heat in melting it down on the hearth.

D is a suitable pipe or burner for supplying a hydrocarbon fuel. C is a steam-pipe adapted to form a jet of steam. These two pipes together form what is known as an "atomizer" or "injector" hydrocarbon-burner. The oil or hydrocarbon fuel is sprayed in by the jet of steam, which so atomizes the oil as to make it burn very rapidly in an excess of air, thus producing intense heat. The amount of heat produced and the amount of fuel fed into the furnace are more easily regulated than when coal, coke, or wood fires are employed. One great advantage of the flame thus produced is its greater oxidizing qualities, or rather it is less objectionable in retarding oxidation than the source of heat used in ordinary furnaces. It is also an advantage of my invention that the heat can be more perfectly regulated than it can be in other furnaces.

In my improved process the steam is partially decomposed by the heat of the furnace, and the oxygen and hydrogen thus liberated being in a nascent state combine more readily with the heated substances, the hydrogen acting to decompose or "crack up" the heavier hydrocarbon compounds in the fuel and cause them to combine more rapidly with the oxygen supplied by the steam and by the air, thus increasing the temperature of the flame. At the same time the oxygen thus liberated from the steam is more active in combining with the lead and in causing the oxygen supplied by the air to combine with the lead, thus greatly facilitating the formation of litharge.

Another important feature of my process is that the fuel can be exactly regulated by the operation merely of two valves, which enables the relative quantities of the two component elements to be changed as desired and which enables the requisite amount of heat to be supplied and, in fact, makes the regulation of the entire process convenient, saving time and expense.

It will of course be understood that air is admitted in proper amount to insure combustion and cause oxidation of the metal.

What I claim as new, and desire to secure by Letters Patent, is—

1. The process of making litharge which consists in subjecting metallic lead to the flame of a hydrocarbon fuel atomized by a jet of steam, substantially as set forth.

2. The process of making litharge which consists in subjecting the surface of a body of molten metallic lead to an oxidizing-flame produced by a suitable hydrocarbon fuel atomized by a jet of steam, substantially as set forth.

3. The process of making litharge which consists in subjecting metallic lead to the flame of a hydrocarbon fuel mingled with steam and air, substantially as set forth.

In testimony whereof I have signed my name to this specification in the presence of two subscribing witnesses.

JOHN W. BAILEY.

Witnesses:
WILLIAM S. YOUNG,
EDWIN SEGER.